United States Patent [19]
Dix et al.

[11] Patent Number: 5,390,221
[45] Date of Patent: Feb. 14, 1995

[54] DEBRIS FILTERS WITH FLOW BYPASS FOR BOILING WATER REACTORS

[75] Inventors: Gary E. Dix, Saratoga; Bruce Matzner, San Jose, both of Calif.

[73] Assignee: General Electric Company, San Jose, Calif.

[21] Appl. No.: 110,744

[22] Filed: Aug. 23, 1993

[51] Int. Cl.⁶ .............................................. G21C 1/04
[52] U.S. Cl. ..................... 376/352; 376/310
[58] Field of Search ............ 376/352, 310, 312, 439, 376/446; 976/DIG. 60, DIG. 264

[56] References Cited

U.S. PATENT DOCUMENTS

| | | | |
|---|---|---|---|
| 1,240,081 | 9/1917 | Moss | 210/521 |
| 1,504,233 | 8/1924 | Graham | 210/446 |
| 1,992,472 | 2/1935 | Craig | 210/165 |
| 3,414,474 | 12/1968 | Swanson | 376/313 |
| 3,528,885 | 9/1970 | Kumpf | 376/440 |
| 3,725,199 | 4/1973 | Notari et al. | 15/22 |
| 3,801,453 | 4/1974 | Jones | 376/440 |
| 3,840,051 | 10/1974 | Akashi | 138/37 |
| 3,844,888 | 10/1974 | Calvin | 376/439 |
| 3,878,870 | 4/1975 | Atherton | 138/42 |
| 3,879,259 | 4/1975 | Persson | 376/224 |
| 3,945,883 | 3/1976 | Hind | 376/280 |

(List continued on next page.)

FOREIGN PATENT DOCUMENTS

| | | |
|---|---|---|
| 90104066.5 | 12/1990 | China . |
| 0196611 | 10/1986 | European Pat. Off. . |
| 0289829 | 11/1988 | European Pat. Off. . |
| 0311037 | 4/1989 | European Pat. Off. . |
| 0432738 | 6/1991 | European Pat. Off. . |
| 0432739 | 6/1991 | European Pat. Off. . |
| 0435744 | 7/1991 | European Pat. Off. . |
| 0455011 | 11/1991 | European Pat. Off. . |
| 0466553 | 1/1992 | European Pat. Off. . |
| 54-19080 | 2/1979 | Japan . |
| 57-102215 | 6/1982 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-111795 | 5/1991 | Japan . |

(List continued on next page.)

Primary Examiner—Donald P. Walsh
Assistant Examiner—Meena Chelliah
Attorney, Agent, or Firm—J. E. McGinness

[57] ABSTRACT

In a boiling water nuclear reactor fuel bundle, a debris catching arrangement is disclosed for incorporation within the flow plenum up stream or below the rod supporting grid of the lower tie plate assembly. The device is preferably placed within the lower tie plate flow plenum between the fuel bundle inlet and the rod supporting grid structure supporting the fuel rods; alternate placement can include any inlet channel upstream of the fuel rods including the fuel support casting. The disclosed debris catching designs include strainer structures defining spatially separated straining or obstructing layers imparting to the fluid in the plenum a circuitous flow path. This circuitous flow path causes the two phase separation of the heavier debris from the lighter transporting water by flow direction change with the debris directed and detoured to a trapping structure. Further, a strainer structure is provided in the plenum that does not constitute a continuum of fine structure across the strained plenum which might become clogged to the extend that overall flow is restricted. The strainer structure is positioned so that eventual trapping of the debris occurs upon cessation of flow so that with removal of the plenum from the reactor, such as removal of the fuel bundle, the debris is likewise removed. Embodiments are disclosed which include swirling deflection, cone deflection, and strainer structure deflection of debris.

8 Claims, 3 Drawing Sheets

U.S. PATENT DOCUMENTS

| | | | |
|---|---|---|---|
| 3,971,698 | 7/1976 | Wolff | 376/352 |
| 4,032,398 | 6/1977 | Cross et al. | 376/443 |
| 4,036,690 | 7/1977 | Betts | 376/175 |
| 4,053,358 | 10/1977 | Pennell | 376/280 |
| 4,053,359 | 10/1977 | Pennell | 375/365 |
| 4,076,586 | 2/1978 | Bideau et al. | 376/364 |
| 4,096,032 | 6/1978 | Mayers | 376/313 |
| 4,116,764 | 9/1978 | Jones | 376/280 |
| 4,198,272 | 4/1980 | Salmon | 376/175 |
| 4,412,969 | 11/1983 | Tilbrook | 376/280 |
| 4,420,457 | 12/1983 | Le Pargneux | 376/446 |
| 4,427,624 | 1/1984 | Marlatt et al. | 376/352 |
| 4,446,099 | 5/1984 | Schwind | 376/277 |
| 4,505,877 | 3/1985 | Rion | 376/352 |
| 4,610,838 | 9/1986 | Gasparro et al. | 376/248 |
| 4,614,636 | 9/1986 | Walters | 376/451 |
| 4,615,862 | 10/1986 | Huckestein | 376/352 |
| 4,634,525 | 1/1987 | Yant | 210/171 |
| 4,652,425 | 3/1987 | Ferrari | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/313 |
| 4,684,495 | 8/1987 | Wilson | 376/352 |
| 4,684,496 | 8/1987 | Wilson | 376/352 |
| 4,716,012 | 12/1987 | Gasparro | 376/352 |
| 4,772,447 | 9/1988 | Manson | 376/441 |
| 4,781,884 | 11/1988 | Anthony | 376/439 |
| 4,826,653 | 5/1989 | Nylund | 376/444 |
| 4,828,791 | 5/1989 | DeMario | 376/352 |
| 4,832,905 | 5/1989 | Bryan | 376/352 |
| 4,849,161 | 7/1989 | Brown | 376/439 |
| 4,900,507 | 2/1990 | Shallenberger | 376/352 |
| 4,919,883 | 4/1990 | Bryan | 376/352 |
| 4,980,121 | 12/1990 | Roberts | 376/439 |
| 5,009,839 | 4/1991 | King | 376/352 |
| 5,024,806 | 6/1991 | Cioffi | 376/352 |
| 5,024,807 | 6/1991 | Hatfield | 376/440 |
| 5,030,412 | 7/1991 | Yates | 376/352 |
| 5,037,605 | 8/1991 | Riordan | 376/352 |
| 5,071,617 | 12/1991 | Bryan et al. | 376/313 |
| 5,094,802 | 3/1992 | Riordan | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,180,545 | 1/1993 | Grattier | 376/352 |
| 5,219,517 | 6/1993 | Nylund | 376/352 |
| 5,230,861 | 7/1993 | Nylund | 376/439 |
| 5,282,231 | 1/1994 | Adams et al. | 376/352 |

DEBRIS FILTERS WITH FLOW BYPASS FOR BOILING WATER REACTORS

In a boiling water nuclear reactor fuel bundle, a debris catching arrangement is disclosed for incorporation within a flow plenum up stream of the rod supporting grid of the lower tie plate assembly. The disclosed debris catching designs include the two phase separation of the heavier debris from the lighter transporting water by flow direction (momentum) change with the debris directed and detoured to a trapping structure. This allows for partial flow bypass around the trapping structure, to eliminate potential flow blockage concerns.

BACKGROUND OF THE INVENTION

Boiling water nuclear reactors operate for many years. Commencing with their initial construction and through their service lives, these reactors may accumulate debris in their closed circulation moderator systems. This debris can become an operating hazard if the debris is allowed to enter into the fuel bundle containing core region having the heat generating fuel rods. In order to understand this problem, a summary of reactor construction as it relates to the accumulation of debris needs first to be given. Thereafter, fuel bundle construction will be set forth. Emphasis will be given to the need to preserve substantially unchanged the regions of pressure drop along the flow paths. Thereafter, the effects caused by debris entering into the fuel rod region of the fuel bundles will be summarized.

Boiling water nuclear reactor construction can be simply summarized for purposes of understanding the debris entrainment problem. Such nuclear reactors are provided with a large, central core. Liquid water coolant/moderator flow enters the core from the bottom and exits the core as a water steam mixture from the top.

The core includes many side-by-side fuel bundles. Water is introduced into each fuel bundle through a fuel bundle support casting from a high pressure plenum which is situated below the core. Water passes in a distributed flow through the individual fuel bundles, is heated to generate steam, and exits the upper portion of the core as a two phase water steam mixture from which the steam is extracted for the generation of electricity.

The core support castings and fuel bundle inlets are a source of pressure loss in the circulation of water through the core. This pressure loss assures the substantially even distribution of flow across the individual fuel bundles of the reactor core. When it is remembered that there are as many as 750 individual fuel bundles in a reactor core, it can be appreciated that assurance of the uniformity of flow distribution is important. To interfere with the pressure drop of the fuel bundle flow paths could effect the overall distribution of coolant/moderator within the fuel bundles of the reactor core.

Having set forth the construction of the boiling water nuclear reactor in so far as is appropriate, attention can now be directed to the construction of the fuel bundles themselves.

The fuel bundles for a boiling water nuclear reactor include a fuel rod supporting lower tie plate assembly, which lower tie plate assembly is a cast structure. The lower tie plate assembly includes at its lowest point a downward protruding bail covering an inlet nozzle. This inlet nozzle includes entry to an enlarged flow volume or tie plate plenum within the lower tie plate. At the upper end of the flow volume, there is located a rod supporting grid.

The rod supporting grid has two purposes. First, the rod supporting grid provides the mechanical support connection for the weight of the individual fuel rods to be transmitted through the entire lower tie plate to the fuel support casting. Secondly, the rod supporting grid provides a flow path for liquid water moderator into the fuel bundle for passage between the side-by-side supported fuel rods.

Above the lower tie plate, each fuel bundle includes a matrix of upstanding fuel rods—sealed tubes each containing fissionable material which when undergoing nuclear reaction produce the power generating steam. The matrix of upstanding fuel rods includes at the upper end a so-called upper tie plate. This upper tie plate holds at least some of the fuel rods in vertical side-by-side alignment. Some of the fuel rods are attached to both the upper and lower tie plates. Usually, there are included between the upper and lower tie plates water rods for improvement of the water moderator to fuel ratio, particularly in the upper, highest void fraction region of the fuel bundle.

Fuel bundles also include about seven fuel rod spacers at varying elevations along the length of the fuel bundle. These spacers are required because the fuel rods are long (about 160 inches) and slender (about 0.4 to 0.5 inches in diameter), and could come into abrading contact under the dynamics of fluid flow and nuclear power generation within the fuel bundles. The spacers provide appropriate restraints for each fuel rod at their respective elevations and thus prevent abrading contact between the fuel rods and maintain the fuel rods at uniform spacing relative to one another along the length of the fuel bundle for optimum performance. As will hereafter be developed, these spacers are sites where debris can be trapped and damage the fuel rods.

Each fuel bundle is surrounded by a channel. This channel causes water flowing between the tie plates to be restricted to only one bundle in an isolated flow path between the tie plates. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, it is important to understand that the maintenance of the originally designed flow distribution is important. Specifically, from the lower (high pressure) plenum inlet to the core to the outlet from the core of the steam and water mixture through the upper tie plates of the fuel bundles, about 20 pounds per square inch (psi) of pressure drop is encountered at typical 100% power/100% flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain operating states of the reactor. At the lower tie plate of each fuel bundle, from the inlet nozzle into the flow volume and through the fuel rod supporting grid, about 1 to 1½ psi pressure drop occurs which contributes to establishing flow distribution between the individual fuel rods of each fuel bundle. Finally, through the fuel bundle itself—from the lower supporting grid to the exit at the upper tie plate—about 11 psi of pressure drop usually occurs.

When new fuel bundles are introduced into a reactor core, their total pressure drop should be preserved. Otherwise, the coolant/moderator flow distribution could be compromised.

Having summarized the construction and operation of a boiling water nuclear reactor, the problem of debris resident within the closed circulation moderator system of the reactor can now be understood. Typically debris within boiling water nuclear reactors can include extraneous materials left over from reactor construction. Further, corrosion during the reactor lifetime also liberates debris. Finally, and during the numerous outages and repairs, further debris accumulates. It will therefore be understood that nuclear reactors constitute closed circulation systems that essentially accumulate debris with increasing age.

It has been discovered that a particularly vexing and usual place for the deposition of debris is in the fuel bundles between the fuel rods particularly in the vicinity of the fuel rod spacers. It will be remembered that each fuel rod is surrounded by the spacer at the particular elevation of the spacer. Debris particles tend to lodge between the spacer structure and the fuel rods and often dynamically vibrate with the coolant/moderator flow in abrading contact to the sealed cladding of the fuel rods. Such flow induced vibration within the reactor, can and has both damaged—as by fretting—as well as ruptured the cladding of the fuel rods. If a sufficient number of cladding ruptures occurs, plant shutdown could be necessary.

It is to be understood that modern nuclear plants have both redundancy and many safety systems designed to counteract anticipated operating casualties, such as fuel rods becoming punctured by debris. Such failures are not catastrophic. However, in almost all cases they result in the plant operating at less than optimum efficiency. Thus, it is highly desirable to reduce the incidence of debris damage to fuel rods.

It will be further understood that to a certain extent the rod supporting grid of the fuel bundle acts as a strainer. Debris exceeding the dimension of grid passageways cannot pass through to the fuel bundles. However, it has been found that debris—especially debris with "sail areas"—such as metal shavings, wire and the like—move past the lower rod supporting grid and can become lodged between the fuel rods and spacers.

SUMMARY OF THE PRIOR ART

Prior art attempts at the placement of devices for preventing debris from entering into the regions of the fuel rods have included alteration of the grid support structure of the lower tie plate assembly. In Nylund U.S. Pat. No. 5,100,611 issued Mar. 31, 1992, an alteration to the grid structure is disclosed. This alteration includes placing the required through holes of the grid structure with flow channel parts that have center lines that are non-collinear. Because these flow channels are part of the fuel rod supporting grid, the size of the through holes is necessarily large to preserve the rod supporting grid strength and the area over which the holes are distributed is only co-extensive to the lower tie plate assembly at the supporting grid.

Attempts to screen debris have been made in pressurized water reactors. In Bryan U.S. Pat. No. 4,664,880 issued May 12, 1987 a wire mesh debris trap is utilized at the bottom of a pressurized water reactor fuel bundle. In Rylatt U.S. Pat. No. 4,678,627 issued Jul. 7, 1987, this structure is modified to include a debris retaining trap. These pressurized water reactor fuel bundles constitute open structures and lack the channel confined flow path between the lower high pressure plenum through the fuel support casting and the upper and lower tie plates of the fuel bundle common to boiling water nuclear reactors. The channel structure, required in boiling water nuclear reactor construction, is wholly absent in pressurized water reactor construction. Since flow can occur between adjacent fuel bundles in a pressurized water reactor along the entire length of the fuel bundles, the placement of the disclosed screens and traps does not occur within a confined flow path.

In one prior art debris catching device, the lower tie plate is modified with serpentine path—almost in the form of a chevron. Overlying this construction there are placed rod supporting bars so that the weight of the rods does not crush the underlying serpentine path.

SUMMARY OF THE INVENTION

In a boiling water nuclear reactor fuel bundle, debris catching arrangements are disclosed for incorporation within the flow plenum upstream or below the rod supporting grid of the lower tie plate assembly. The device is preferably placed within the lower tie plate flow plenum between the fuel bundle inlet orifice and the rod supporting grid structure supporting the fuel rods; alternate placement can include any inlet channel upstream of the fuel rods including the fuel support casting. The disclosed debris catching designs includes strainer structures defining spatially separated straining or obstructing layers imparting to the fluid in the plenum a circuitous flow path. This circuitous flow path causes the two phase separation of the heavier debris from the lighter transporting water by flow direction (momentum) change with the debris directed and detoured to a trapping structure. Further, a strainer structure is provided in the plenum that does not constitute a continuum of fine structure across the strained plenum which might become clogged to the extend that overall flow is restricted; spatial separation exists in between the disclosed strainer structures. The straining structure is positioned so that eventual trapping of the debris occurs upon cessation of flow so that with removal of the plenum from the reactor, such as removal of the fuel bundle, the debris is likewise removed. Embodiments are disclosed which include swirling deflection, cone deflection, and strainer structure deflection of debris.

BRIEF DESCRIPTION OF THE DRAWINGS

Further understanding of this invention will become more apparent after referring to the following specification and attached drawings in which.

DESCRIPTION OF THE PREFERRED EMBODIMENT

Figure 1:
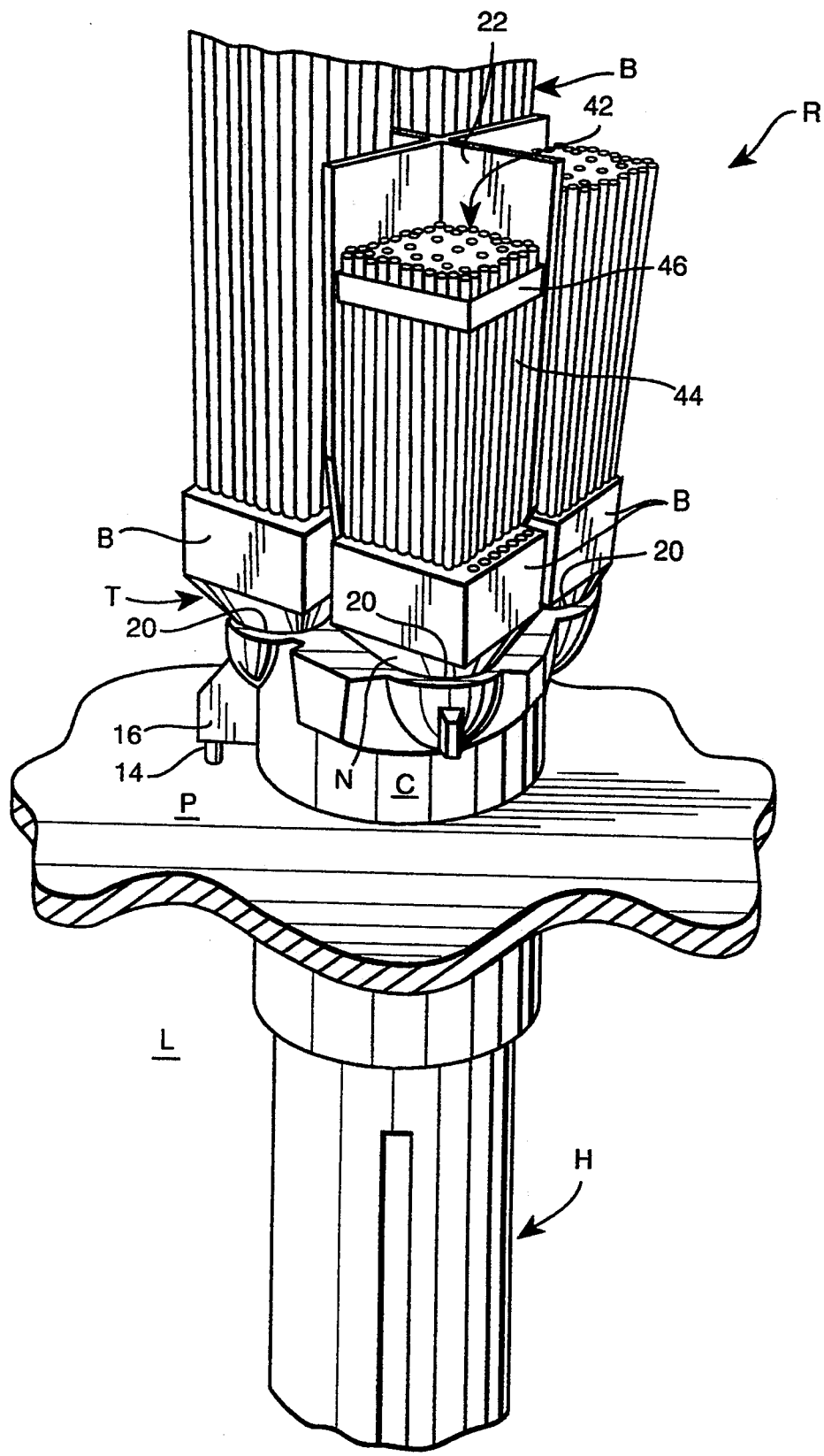
FIG. 1 is a perspective view of a portion of the lower high pressure plenum, the fuel support casting, and four supported fuel rods on the fuel support casting, thus illustrating plenums down stream of the rod supporting grid in which the devices of this invention can be located.

Referring to FIG. 1, a pertinent detail of a portion of a reactor core is shown. Control rod drive housing H has fuel support casting C supported thereon. Fuel support casting C includes arm 16 which orients casting C with respect to pin 14 in core plate P.

Core plate P divides high pressure lower plenum L from core R, preserving the necessary pressure differential barrier to cause the controlled circulation within the many individual fuel bundles of the reactor.

Fuel support casting C includes four apertures 20 onto which four fuel bundles B at their respective lower tie plate assemblies T are placed. Each lower tie plate assembly T is disposed to cause its inlet nozzle N to communicate to one of the apertures 20 of the fuel support casting.

Fuel support casting C also includes apertures through which control rods 22 penetrate to the interstices of the four fuel bundles sitting on top of the fuel support casting C. Since the action of the control rods is not important with respect to this invention, further discussion of this aspect of the reactor will not be included.

Each fuel bundle includes a plurality of upstanding fuel rods 42 surrounded by a channel 44. Spacers 46 surround the fuel rods 42 discretely at several elevations and constitute locations where debris can be trapped, dynamically fretted by the passing coolant, and cause damage to fuel rods 42. Accordingly, and in this disclosure, the filter of this invention is located in any of the illustrated plenums to the rod supporting grid G of the lower tie plate (See FIGS. 2, 3 and 4), or in the fuel support casting C.

In the following illustrations, the debris catchers of this invention will be illustrated with location in the lower tie plate flow plenum between the inlet orifice or nozzle N and the rod supporting grid G.

Remembering further that only four out of a possible 750 fuel bundles are illustrated, it will be understood that the pressure drop across core plate P is important. Accordingly, a review of the pressure drop within a boiling water nuclear reactor can be instructive.

First, and through an orifice (not shown) in the fuel support casting C, an approximate 7 to 8 psi pressure drop occurs at typical 100% power/100% flow operating conditions. This pressure drop is utilized to ensure uniform distribution of bundle coolant flow through the many (up to 750) fuel bundles within a boiling water nuclear reactor.

Secondly, at in the lower tie plate of the fuel bundles on each fuel support casting C, approximately 1½ psi of pressure drop occurs. This pressure drop is a result primarily of the changes in flow velocity and direction occurring through this complex geometry structure.

Finally, and as the coolant rises and generates steam within the fuel bundle, approximately 10 to 12 psi of pressure drop is incurred. This pressure drop is distributed throughout the length of the fuel bundle—and is important to the operating stability of both the individual fuel bundles and the collective fuel bundles constituting the core of the nuclear reactor.

The reader should understand that the summary of pressure drop given above is an over simplification. This is a very complex part of the design and operation of a nuclear reactor. Having said this much, one point must be stressed. Flow resistance within the individual fuel bundles of a boiling water must remain substantially unchanged. Accordingly, if apparatus for preventing debris entrainment into the fuel bundles is going to be utilized, appreciable change in overall fuel bundle flow resistance should be avoided.

Regarding the overall performance of a debris catcher or trap, such structure must be capable of trapping particles small enough to be entrained but large enough to enter through the lower tie plate grid G and in between the fuel rods 42. Such a structure must be structurally sound and especially avoid any failure resulting in loose parts. It is desired that the structure trap and retain debris particles. At the same time, adverse flow conditions into the fuel bundle should not be generated.

Finally, the filter should be such that it is not possible under any circumstances for the filter to become clogged and cause appreciable obstruction to the total flow into the fuel bundle B. Accordingly, and in the description of the specific embodiments that follow it will be seen that we utilize a filter structure that does not constitute a continuum of structure across the particular flow plenum being utilized. In each case—assuming that the perforate portions of the filter become complete clogged—it will be seen that unobstructed water coolant flow paths are preserved to the fuel rods.

The following designs direct debris particles into screen or mesh paths that intercept only a fraction of the total flow path. This minimizes pressure drop. At the same time, solid portions can be incorporated to the mesh structures to impart required resistance to failure.

Figure 2:
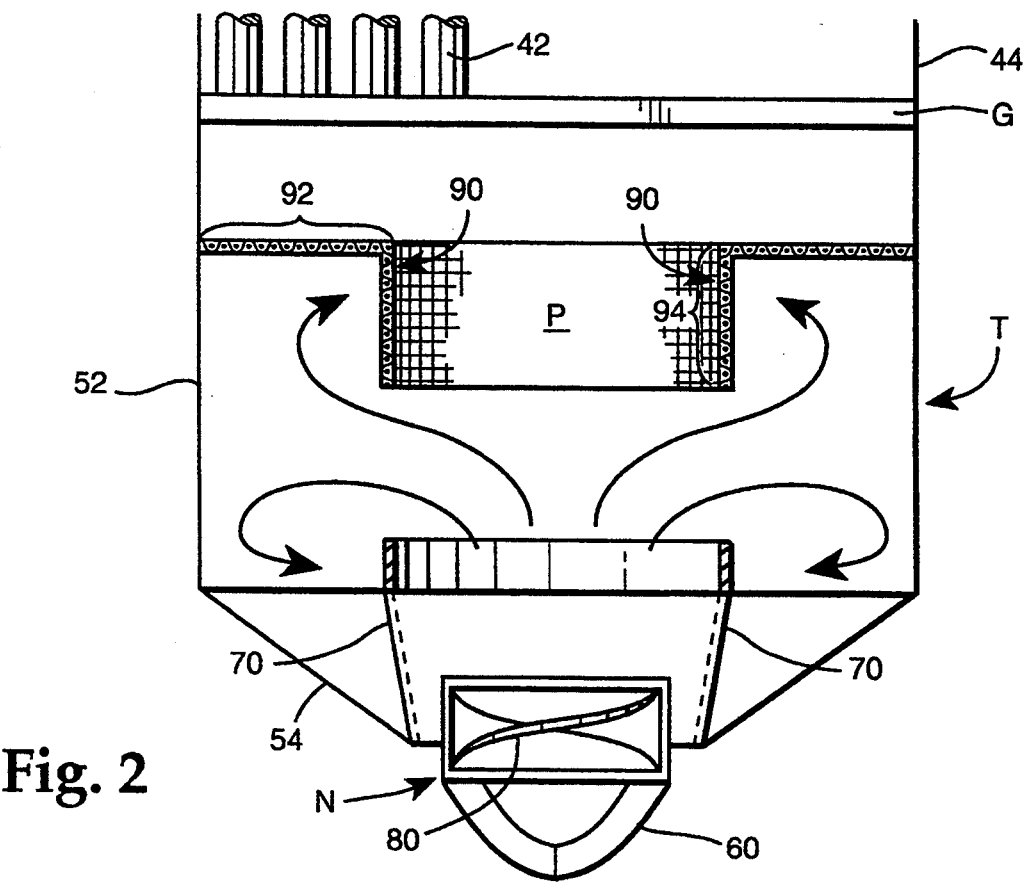
FIG. 2 is a side elevation schematic of the lower tie plate plenum illustrating a centrifugal flow debris trap including a static swirl inducing member adjacent the inlet orifice, an overlying strainer trap, and an underlying debris collector ring.

Referring to FIG. 2, a side elevation section schematic of a lower tie plate assembly T is shown. This lower tie plate includes four walls 52 defining a substantially square volume with tapered substantially conical wall 54 truncated at inlet nozzle N. Nozzle N includes a bail 60 over the nozzle forming the lower most structure of the fuel bundle.

In the structure illustrated in FIG. 2, there is included a debris collector ring 70. Ring 70 fastens interiorly of plenum P surrounding nozzle N and projects upwardly into the volume of plenum P. As will be realized hereafter, ring 70 forms between the inside of conical wall 54 and the outside surface of ring 70 a trap for debris.

Secondly, located above or preferably within nozzle N is static swirl vane 80. Swirl vane 80 imparts an upwardly spiralling flow to coolant flowing through nozzle N into plenum P. Such spiral flow classifies heavier debris to the outside of ring 70 with the lighter coolant flowing upwardly through rod supporting grid G.

Finally, mesh pick off filter 90 including horizontal portion 92 and downward depending ring 94 is placed centrally of the structure. Preferably, the structure is perforate for allowing fluid flow through the mesh pick off structure; it will be understood that portions of this structure can be solid if desired.

Operation is easy to understand. Water coolant including debris enters nozzle N and has a swirling motion imparted by a static swirl vane 60. Above the static swirl vane there is an open central flow path. Heavier debris—typically metal particles having 8 to 10 times the density of water—are classified to the exterior of plenum P and trapped—either by ring 70 or overlying mesh pick off filter 90. Debris is retained at these locations. At the same time, the open central flow path is not obstructed by a continuum of filter structure. Obstruction of the filter structure causing impeding of flow to the fuel rods 42 cannot occur.

It is anticipated that the length of pitch of static swirl device 80 will be adjusted for optimum performance. Further, dimension of debris collector ring 70 and mesh pick off filter 90 will likewise be adjusted for optimum trapping of debris.

It is to be noted that upon cessation of flow, debris trapped at mesh pick off filter 90 will fall. In such a fall, trapping of the debris will occur at ring 70. Thus, and in the case of the illustrated fuel bundle B, with removal of the fuel bundle removal of the debris will occur.

Figure 3:
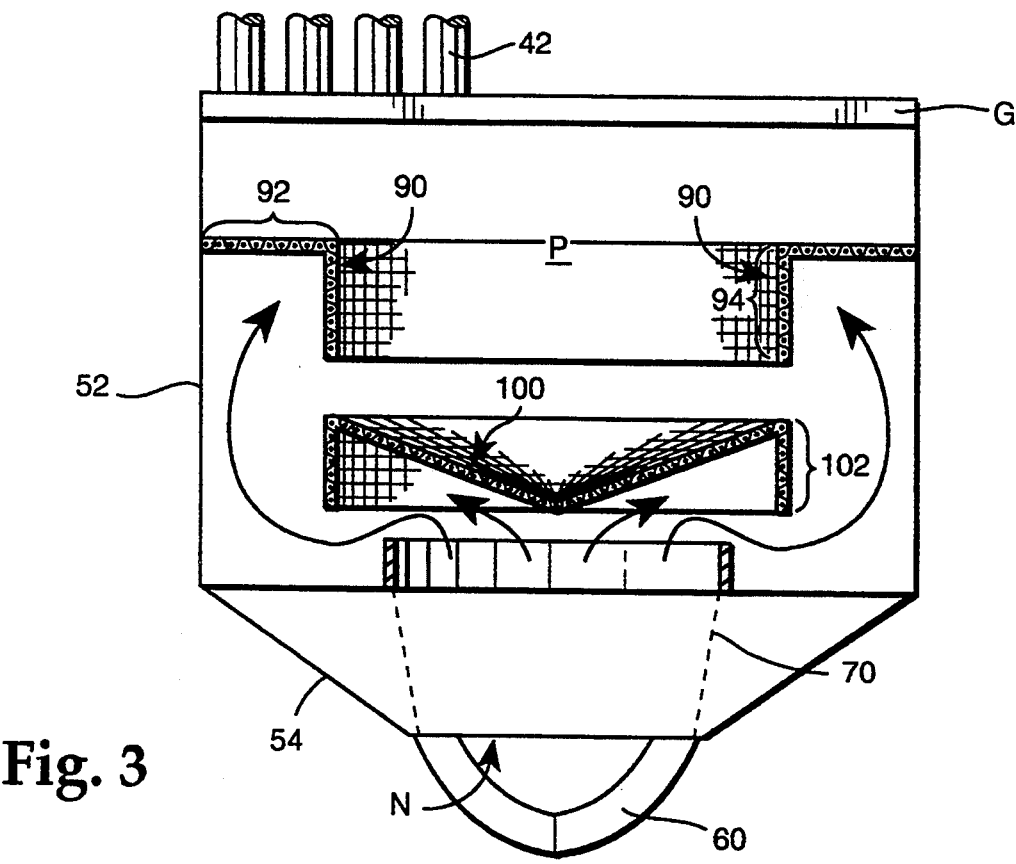
FIG. 3 is a side elevation schematic of the lower tie plate plenum illustrating cone deflector in combination with a peripheral strainer ring, an overlying strainer trap, and an underlying debris collector ring; and, FIG. 4 is a stacked mesh filter debris trap in which successive overlying and underlying filter layers form a circuitous and trapping debris path and underlying debris collector.

Referring to FIG. 3, a structure similar to FIG. 2 is illustrated with the exception of cone deflector 100. This deflector peripherally diverts fluid to the plenum periphery at the cone 100. This cone can be constructed of mesh and/or solid material.

Cone 100 extends beyond ring 70 and terminates in depending mesh ring 102. Depending mesh ring 102 is outside of ring 70.

Operation is easy to understand. Debris entraining water coolant is deflected at cone 100 with debris being trapped either at debris collector ring 102 or the mesh pick off filter. Debris falling from either location—either during coolant flow or after coolant flow has ceased—will fall into the outside of the ring 70 and be trapped by ring 70 within lower tie plate T.

Figure 4:
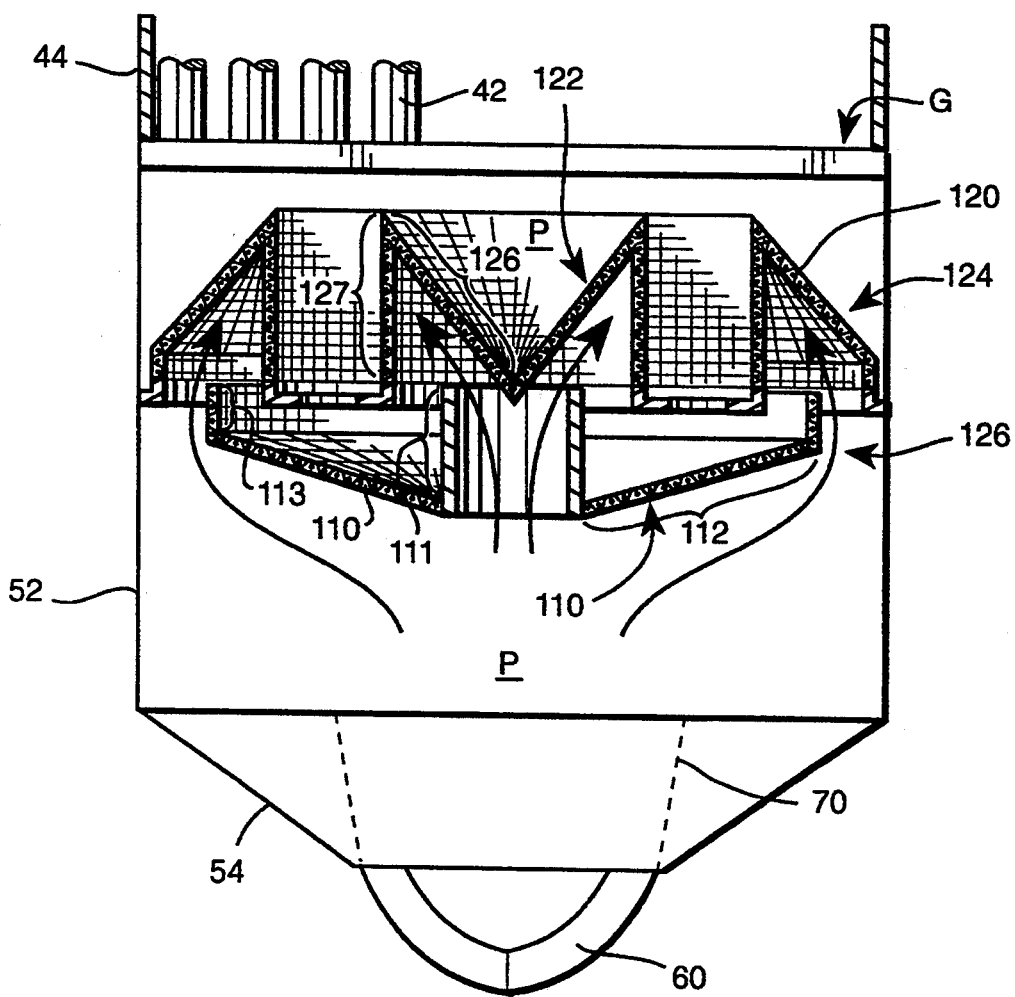

Referring to FIG. 4, a structure similar to that illustrated in FIGS. 2 and 3 is illustrated in which upper filter layer 124 and lower filter layer 114 impart the circuitous flow path to the passing fluid.

Lower filter structure 114 includes cone filter 110 having a solid central ring 11 to define a central flow path. A peripherally sloping perforate cone 110 truncated at the central flow paths extends to perforate ring 113.

Upper filter layer 124 consists of peripheral annular perforate filter section 120 and central inverted conical basket 122. Conical basket 122 includes an inverted perforate cone section 126 and a depending perforate ring section 127.

In operation, it will be seen that the disclosed design includes offset over-under placement of layered traps for debris particles. At the same time, open flow passages are preserved so that complete debris or corrosion clogging of the filter cannot occur. The sloped profile of the filter assists migration of the trapped debris to the collecting corners of the upper filter layer 124. Debris falling from these upper layer 124 corners is either trapped by lower filter layer 114 or optional ring 70.

In the schematic of the apparatus herein illustrated, a ring, cone, and annulus structure is shown. The reader will understand that a straight structure across plenum P having the overall side elevation of the ring structure illustrated could as well be used.

What is claimed is:

1. In a boiling water reactor fuel bundle, a debris catcher construction for placement within the flow volume defined by an inlet plenum to the lower tie plate assembly to the upper fuel rod supporting grid comprising:

first means including spatially axially separated strainer structures across said plenum for imparting a flow direction (momentum) change to passing water coolant, said first means not forming a continuum across said plenum such that at least one substantially unobstructed flow path is preserved through said first means; and second means defining a trapping structure for trapping debris separated from said water coolant by said flow direction change imparted by said first means.

2. The invention of claim 1 and wherein:

said means defining spatially separated structures across said plenum includes a deflecting cone.

3. The invention of claim 1 and wherein:

said means defining said spatially separated structures is located within a lower tie plate of a fuel bundle between an inlet orifice and said rod supporting grid.

4. In a boiling water reactor fuel bundle comprising in combination:

a plurality of upstanding side-by-side fuel rods;

a lower tie plate including a rod supporting grid for supporting said plurality of upstanding side-by-side fuel rods;

means for maintaining said fuel rods in upstanding side-by-side relation;

a channel surrounding said plurality of upstanding fuel rods from the vicinity of said lower rod supporting grid along the length of said fuel rods to form a discrete flow path through said fuel bundle;

an inlet plenum to the lower tie plate assembly to the upper fuel rod supporting grid;

first means defining spatially separated strainer structures across said inlet plenum for imparting flow direction change to passing water coolant, said means defining said spatially separated strainer structure not forming a continuum across said plenum such that at least one substantially unobstructed flow path is preserved through said first means; and second means defining a trapping structure for the trapping separation of the debris separated from said water coolant by said flow direction change imparted by said first means.

5. The invention of claim 4 and wherein said spatially separated strainer structures are placed in overlapping relationship across said plenum with axial spatial separation therebetween.

6. The invention of claim 5 and wherein said means defining trapping structures includes solid portions and perforate portions.

7. The invention of claim 4 and wherein:

said inlet plenum includes a ring for trapping debris fastened to a portion of said plenum.

8. The invention of claim 7 and wherein:

said inlet plenum is located in said lower tie plate between an inlet orifice and said rod supporting grid.

* * * * *